June 5, 1928.
C. P. DAVIS ET AL
1,672,449
METHOD OF MAKING ALKALI CYANIDES
Filed Dec. 24, 1924
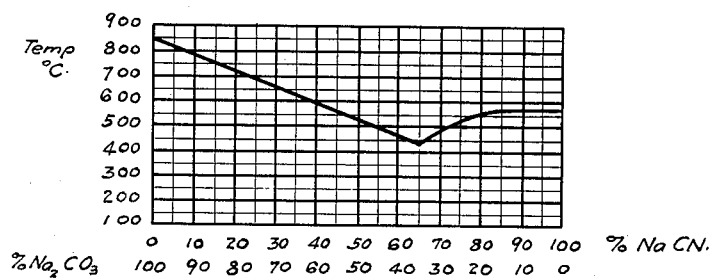
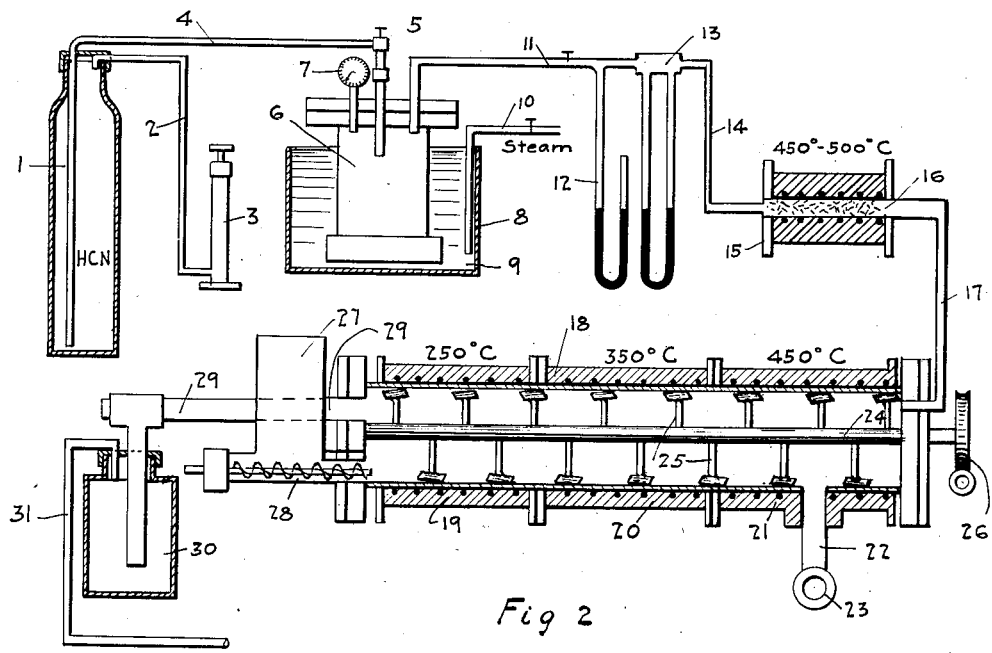
Charles P. Davis &
Grenville B. Frost
INVENTORS
BY _____
ATTORNEY.

Patented June 5, 1928.

1,672,449

UNITED STATES PATENT OFFICE.

CHARLES P. DAVIS, OF ELIZABETH, NEW JERSEY, AND GRENVILLE B. FROST, OF KINGSTON, ONTARIO, CANADA, ASSIGNORS TO AMERICAN CYANAMID COMPANY, OF NEW YORK, N. Y., A CORPORATION OF MAINE.

METHOD OF MAKING ALKALI CYANIDES.

Application filed December 24, 1924. Serial No. 757,831.

This invention relates to cyanides, more particularly to the production of an alkali metal cyanide from hydrocyanic acid.

It has been proposed to manufacture alkali metal cyanides by the treatment of a suitable alkali metal hydroxide or carbonate with hydrocyanic acid gas. The following equation illustrates the reaction which takes place in the manufacture of sodium cyanide:

$$Na_2CO_3 + 2HCN = 2NaCN + CO_2 + H_2O$$

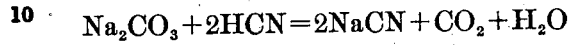

This reaction is reversible and proceeds to the right with appreciable velocity and with good conversions at temperatures between 200° and 500° C. According to the proposed process of the prior art a mass of alkali metal carbonate was heated to a temperature of the order above stated and was exposed to the action of gaseous hydrocyanic acid to form alkali metal cyanide and evolve water and carbon dioxide. At the lower temperatures the conversion is so incomplete that a high grade cyanide could not be economically produced. If the alkali metal carbonate was heated to the higher temperatures at which conversion is more nearly complete, the partially converted material tended to fuse and to form lumps, thereby retarding and to a large extent preventing the absorption of more hydrocyanic acid gas. As a result a high grade product (85%–95% NaCN) could not be produced commercially by this method.

Our invention is intended to obviate these difficulties, it being among the objects thereof to improve upon the prior method and to produce a high grade alkali metal cyanide by the interaction of an alkali metal carbonate with hydrocyanic acid.

After numerous tests and experiments we discovered that the partial fusion of the material being treated by prior methods was caused by the formation during the treatment of a series of mixtures of carbonate and cyanide, which had varying melting points lower than either the carbonate or cyanide alone. These mixtures, we have determined, form a continuous series including a eutectic mixture containing about 65% cyanide and 35% carbonate and melting at a temperature about 120° C. below the melting point of the pure cyanide. Based upon these observations we provide a process wherein we heat the carbonate in the presence of hydrocyanic acid gas to a temperature sufficiently below the eutectic point to prevent incipient fusion, and maintain said temperature until the eutectic composition is passed. We then raise the temperature to complete the conversion but keep the same sufficiently below the melting point of the mixture at all stages to prevent incipient fusion.

The following is an example of our process. A layer of anhydrous sodium carbonate from one-quarter to one-half inch thick is heated to a temperature of 200° to 350° C. in a suitable furnace, and hydrocyanic acid gas is passed over the heated carbonate until a mixture containing in excess of 65% sodium cyanide has been produced. The temperature of the mixture is then raised to a point between 400° C. and 500° C. and hydrocyanic acid gas is passed over the mixture until a sodium cyanide of the desired grade is obtained. A sodium cyanide containing in excess of 98% NaCN may be produced by this method, provided raw materials of high purity are used.

The invention is seen to comprise two essential steps. In the first step the reaction takes place at a temperature below the melting point of the eutectic mixture of cyanide and carbonate and is allowed to proceed until a mixture is produced which contains a higher percentage of sodium cyanide than the eutectic mixture contains. This latter mixture is utilized for the second step in which temperatures above the melting point of the eutectic mixture may be used. In the first step of our process we may, however, use temperatures higher than the eutectic temperature provided we at no time use a temperature sufficiently high to cause incipient fusion. This procedure may involve heating the carbonate to a high temperature, say 700° C., passing hydrocyanic acid gas over the carbonate, and gradually reducing the temperature to below the eutectic point as the reaction proceeds. As soon as the eutectic composition is passed the temperature is raised and the conversion completed at higher temperatures. For the best results the temperature should not be higher than 100° C. below the melting point of the mixture at any stage of the process.

In the accompanying drawing, constituting a part hereof, Fig. 1 is a diagram showing the melting points of the various mixtures of sodium cyanide and sodium carbonate, and Fig. 2 is a view, partially diagrammatic and partially in vertical section, of an apparatus adapted to the practice of our invention.

Referring to Fig. 1, it will be noted that by progressively adding sodium cyanide to anhydrous sodium carbonate, which melts at about 849° C., the melting point thereof is progressively lowered in direct relation to the amount of sodium cyanide in the mixture. The melting point curve is therefore a straight line function which reaches a minimum at a melting point of about 440° C., at which point the composition of the mixture is approximately 65% sodium cyanide and 35% sodium carbonate. As the proportion of cyanide in the mixture is still further increased, the melting point thereof rises rapidly until the sodium cyanide content of the mixture is about 80%, after which the further addition of sodium cyanide results in a slight raising of the melting point to about 562° C., the melting point of pure sodium cyanide. The variations in the melting points of mixtures of sodium cyanide and sodium carbonate explain why, in the prior methods, difficulty was encountered in preparing from sodium carbonate a sodium cyanide having a high cyanide content. If the temperature of conversion was high, say 450° to 500° C., as conversion progressed the mass tended to fuse because of the low melting eutectic containing 65% sodium cyanide, the fusion preventing further absorption of hydrocyanic acid by the mixture. If the temperature was kept low, say, about 300° C., the difficulty of fusion was avoided but the amount of conversion was so small at such temperature that a high grade sodium cyanide could not be produced economically.

In Fig. 2 is shown an apparatus adapted to carry out our method which is based upon the data tabulated in the diagram of Fig. 1. There is provided a cylinder or other container 1 for liquid hydrocyanic acid to which is connected by a pipe 2 a pump 3 whereby pressure may be exerted upon the liquid in cylinder 1, which is thereby forced through pipe 4, regulating valve 5 and into vaporizer 6, which is provided with a pressure gauge 7. A tank or jacket 8, containing a liquid 9, such as water, surrounds the vaporizer 6 and maintains the same, by means of steam entering through pipe 10, at a sufficiently high temperature to vaporize the liquid hydrocyanic acid. The vapors pass through pipe 11, by the manometer 12, through flow meter 13 and pipe 14 into the purifying furnace 15. The furnace is filled with broken bits of iron or similar material 16 and is heated by an electric resistor element to a temperature of 450° to 500° C.

A pipe 17 conducts the vapors from furnace 15 to the reaction furnace which consists essentially of a tube 18, preferably slightly inclined to the horizontal and provided with a series of electric resistor elements 19, 20 and 21, which are adapted to heat the same to varying temperatures, as 250°, 350° and 450° C., respectively. An opening 22 is provided in the lower end of the inclined tube 18 and has a conveyor 23 in such relation thereto as to remove solid material which falls into the said opening. Centrally disposed within the furnace is a shaft 24 carrying a series of helically arranged inclined plough members 25, rigidly secured thereto and adapted to be rotated by the worm and gear drive 26. A hopper 27, provided with a screw conveyor 28 feeds material into the upper end of the furnace. An outlet pipe 29 for gases at the same end of the furnace terminates in a chamber 30 which is adapted to collect any solid particles carried along with the gases. The outlet 31 leads the residual gases away from the apparatus for recovery or disposal in any desired manner.

The operation of the apparatus for the production of sodium cyanide from anhydrous sodium carbonate is as follows:

The various resistor elements are energized to heat the furnaces 15 and 18 to the temperatures indicated, the conveyors 23, 25 and 28 are set in motion and sodium carbonate is placed in hopper 27 to be fed into the furnace 18. Air pressure from pump 3 is placed on cylinder 1, causing liquid hydrocyanic acid to flow through pipe 4, the regulating valve 5 and into the vaporizer, from which the gasified hydrocyanic acid passes into the furnace 15 filled with iron at a relatively high temperature, causing a reaction to take place whereby any combined sulphur, such as hydrogen sulphide, in the gas is decomposed and removed. The purified hydrocyanic acid gas then passes into the lower end of the reaction furnace 18 where it comes in contact with the sodium carbonate which moves in the opposite direction and reacts therewith. After the apparatus is in equilibrium, the sodium carbonate is progressively heated as it passes through the zones 19, 20 and 21, at the same time being gradually converted into sodium cyanide. In passing through zones 19 and 20, the highest temperature attained is about 100° below the melting point of the eutectic and there is no tendency for any fusion of the mixture to take place. Before the material enters into the zone 21 of high temperature the material has passed the eutectic point, and therefore the conversion may be completed at the higher temperature to produce a high grade sodium cyanide without any fusion whatsoever.

The converted material falls into opening 22 and is carried away by conveyor 23. The gases produced in the reaction, which are principally carbon dioxide and water vapor together with a small amount of hydrocyanic acid gas which has not been absorbed by the sodium carbonate, pass out through pipe 29 and into chamber 30 where any particles of sodium carbonate or cyanide which may be carried over are deposited. The remaining gases are disposed of as desired.

Our process results in a sodium cyanide of a high degree of purity and we have consistently been able to produce a cyanide of as high a grade as 98.5 per cent. We have no difficulties by reason of fusion of the material during the reaction if we take care that before the temperature is raised to or near the eutectic point the conversion has passed 65 per cent. Our process is continuous and after the apparatus is in equilibrium practically no control thereof is necessary except to provide continuous streams of the materials entering into the reaction.

Although we have described our invention, setting forth an apparatus adapted to the practice thereof and have specifically described the manufacture of sodium cyanide, our invention is not limited thereto as other cyanides, having characteristic melting points in admixture with substances from which they are formed, may be made thereby. Intsead of using liquid hydrocyanic acid we may start with a solid cyanide, such as the well-known impure calcium cyanide, evolve hydrocyanic acid gas therefrom and use the same in our process. If the hydrocyanic acid used is sufficiently low in sulphur as not to materially contaminate the product, we may dispense with the purifying furnace 15. In the reaction furnace we have provided three zones of temperature but our invention is not limited thereto since two zones are all that are essential and it is feasible to have four or more zones in the furnace, or in place of different zones of temperature we may provide a plurality of furnaces, each of which is heated to a predetermined temperature and the material passed therethrough successively. Or we may have but a single furnace adapted to be heated to different temperatures, first heat the same to a low temperature and pass the material therethrough for partial conversion thereof, and then heat the furnace to a higher temperature and pass the partially converted material therethrough for further conversion. These and other changes which will be apparent to those skilled in the art may be made in our invention, the scope of which is defined in the claims appended hereto.

What we claim is:

1. A method of making an alkali metal cyanide which comprises heating the corresponding carbonate in contact with hydrocyanic acid gas to progressively higher temperatures below the melting point of the resulting mixture but sufficiently high to cause conversion of a major portion thereof into cyanide.

2. A method of making an alkali metal cyanide which comprises heating the corresponding carbonate in contact with hydrocyanic acid gas to a temperature below the melting point of the resulting mixture but sufficiently high to cause conversion of a portion thereof and then raising the temperature to substantially complete the conversion, the temperature at all times being below the melting point of the mixture.

3. A method of making an alkali metal cyanide which comprises heating the corresponding carbonate in contact with hydrocyanic acid gas to a temperature below the melting point of the resulting mixture but sufficiently high to cause conversion of a portion thereof and then gradually raising the temperature to substantially complete the conversion, the temperature at all times being below the melting point of the mixture.

4. A method of making an alkali metal cyanide which comprises heating the corresponding carbonate in contact with hydrocyanic acid gas to a temperature below the melting point of the eutectic mixture of alkali metal carbonate-alkali metal cyanide formed until the eutectic composition is passed and then raising the temperature to cause further conversion to take place.

5. A method of making an alkali metal cyanide which comprises heating the corresponding carbonate in contact with hydrocyanic acid gas to a temperature below the melting point of the eutectic mixture of alkali metal carbonate-alkali metal cyanide formed until the eutectic composition is passed and then raising the temperature above said melting point to cause further conversion to take place.

6. A method of making an alkali metal cyanide which comprises heating the corresponding carbonate in contact with hydrocyanic acid gas to cause conversion of the carbonate into cyanide, the temperature during the major portion of the conversion being below the melting point of the mixtures thus formed, the final temperature being about the melting point of the eutectic mixture.

7. A method of making sodium cyanide which comprises heating sodium carbonate in contact with hydrocyanic acid gas to a temperature of 250° to 400° C. to cause partial conversion to take place and then raising the temperature to 400° to 500° C. to cause additional conversion without causing fusion of the mass.

8. A method of making sodium cyanide which comprises heating sodium carbonate in contact with hydrocyanic acid gas to a temperature of 250° to 400° C. to cause at least 65% conversion to take place and then raising the temperature to 400° to 500° C. to cause additional conversion.

9. A method of making sodium cyanide which comprises heating sodium carbonate in contact with hydrocyanic acid gas to a temperature above 250° C. but below 440° C. to cause partial conversion to take place, and then raising the temperature to 400° to 500° C. to cause additional conversion without causing fusion of the mass.

10. A method of making sodium cyanide which comprises heating sodium carbonate in contact with hydrocyanic acid gas to a temperature above 300° C. but below 440° C. until conversion is at least 65% complete and then raising the temperature to 400° to 500° C. to complete the conversion.

11. A method of making sodium cyanide which comprises heating sodium carbonate in contact with hydrocyanic acid gas to a temperature above 300° C. but below 440° C. until conversion is at least 65% complete and then raising the temperature above 400° C. but below 550° C. to complete the conversion.

12. A method of making sodium cyanide which comprises heating sodium carbonate in contact with hydrocyanic acid gas to a temperature below 440° C. until conversion is at least 65% complete and then raising the temperature to complete the conversion.

13. In a method of making an alkali metal cyanide by heating an alkali metal carbonate in contact with hydrocyanic acid gas, the step which comprises causing the reaction to take place at progressively changing temperatures such that throughout the reaction the temperature is below the fusing point of the reacting mixture.

14. In a method of making an alkali metal cyanide by heating an alkali metal carbonate in contact with hydrocyanic acid gas, the step which comprises causing the reaction to take place at progressively changing temperatures such that throughout the reaction the temperature is at least 100° C. below the fusing point of the reacting mixture.

In testimony whereof, we have hereunto subscribed our names.

November 13, 1924.
    CHARLES P. DAVIS.
November 19th, 1924.
    GRENVILLE B. FROST.